United States Patent
Hempel

(10) Patent No.: US 7,386,419 B2
(45) Date of Patent: Jun. 10, 2008

(54) METHOD, APPARATUS, SYSTEM AND COMPUTER PROGRAM PRODUCT FOR SELECTION OF A STATIC EVALUATION METHOD FOR AN EMPIRICAL EXAMINATION OF MEASUREMENT SERIES

(75) Inventor: Eckhard Hempel, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 111 days.

(21) Appl. No.: 11/281,794

(22) Filed: Nov. 17, 2005

(65) Prior Publication Data

US 2006/0155501 A1 Jul. 13, 2006

(30) Foreign Application Priority Data

Nov. 17, 2004 (DE) .................. 10 2004 055 472

(51) Int. Cl.
  *G06F 15/00* (2006.01)
  *G06F 17/18* (2006.01)
(52) U.S. Cl. .................................... 702/179
(58) Field of Classification Search .............. 702/179
  See application file for complete search history.

(56) References Cited

U.S. PATENT DOCUMENTS

| 6,108,635 | A  | * | 8/2000  | Herren et al. .............. 705/2 |
| 6,269,276 | B1 | * | 7/2001  | Akhavan et al. ............ 700/97 |
| 2004/0150665 | A1 |   | 8/2004  | Dyson, III |
| 2005/0021286 | A1 | * | 1/2005  | Kunce ..................... 702/179 |
| 2007/0016379 | A1 | * | 1/2007  | Seymour ................... 702/19 |
| 2007/0288175 | A1 | * | 12/2007 | Tobita et al. ............. 702/22 |

* cited by examiner

*Primary Examiner*—John E. Barlow, Jr.
*Assistant Examiner*—Cindy D. Khuu
(74) *Attorney, Agent, or Firm*—Schiff Hardin LLP

(57) ABSTRACT

In a method, apparatus, system and computer program product for selection of a statistical evaluation method from a set of evaluation methods, the selected statistical evaluation method being optimally designed for a measurement series, three measurement series-specific determination signals are recorded in a first phase and, in a subsequent second phase, a selection of the optimally-designed evaluation method ensues through access to an association mechanism that associates an optimally-designed evaluation method with the recorded determination signals.

18 Claims, 2 Drawing Sheets

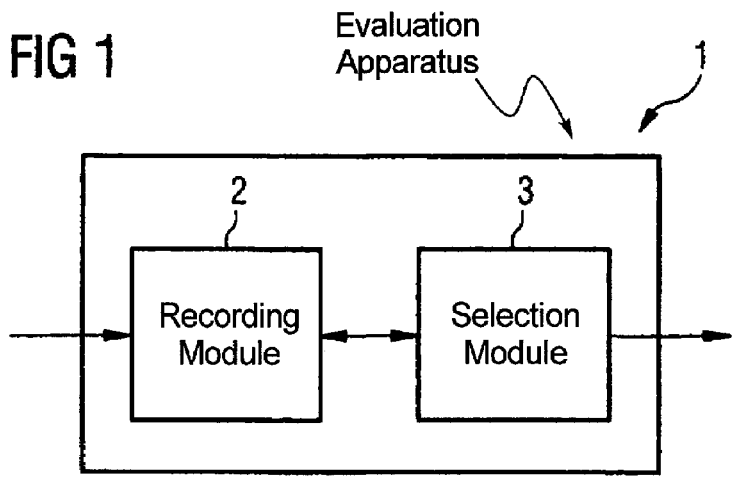

METHOD, APPARATUS, SYSTEM AND COMPUTER PROGRAM PRODUCT FOR SELECTION OF A STATIC EVALUATION METHOD FOR AN EMPIRICAL EXAMINATION OF MEASUREMENT SERIES

BACKGROUND OF THE INVENTION

1. Field of the Invention

The present invention concerns a method, an apparatus and a system for selection of an evaluation method (in particular a static evaluation method) from a number of evaluation methods that are available for evaluating presented information, so that the selected evaluation method is correct and optimally designed with regard to a measurement series to be empirically evaluated.

2. Description of the Prior Art

Empirical examinations in technological fields and in medicine normally involve data processing and/or analysis, in particular of a static evaluation.

There are a number of static decision models and strategies that make a decision as to which measurement series should be evaluated with which static test. The decision strategy should be designed in principle such that the probability of a wrong conclusion is optimally minimized.

For example, if two test results or two measurement series should be compared with one another, various static tests are available for this purpose. Given a number of tests that can be applied in principle, it is possible that a significant difference between the measurement series can be seen in the comparison of two measurement series with a static method A, but no difference is detected with another method B. The selection of a suitable test for the test series to be evaluated is therefore of particular importance.

A problem in the selection of such evaluation methods is that different empirical examinations also require different evaluation methods. The methods differ significantly, for example with regard to the variance of the data or the association of the data with measurement series to be compared. If an incorrectly or non-optimally designed test method is used (selected), it can lead to a misinterpretation of the data and thus to an error with serious consequences.

For example, a test known as the U-test can be applied when two data samples should be compared with one another, where the data in each sample are independent from sample-to-sample. The U-test is a pool choice and can even lead to an incorrect result, however, when measurement values or samples should be compared with one another that have a sample-to-sample dependency. For example, in the case of dependent samples the Wilcoxon test is preferable.

In particular in the field of medical technology, the investigation of data or the measurement values represents a significant effort since patient examinations are regularly required to obtain the data or values. Moreover, the scope of the samples (the number of the measurement values) is often small and thus very sensitive with regard to the selected and applied statistical method. Furthermore, after the selection of a suitable statistical test method it is necessary to adjust specific parameters for the test to achieve an optimal conclusion result. If these parameters are incorrectly set, the result of the statistical test can be incorrect or at least capable of being misunderstood.

At present there is no computer-aided, automatic selection method for selecting a statistical evaluation method for measurement series that are in particular based on medical data. Conventionally, a specialist in the field of statistics normally has been consulted if a correct statistical evaluation method must be selected. An automatic computer-aided, dialog-based selection of a statistical evaluation method is not available in the field of medical technology. Another possibility is to manually select the statistical evaluation method by conducting research in known publications that are based on similar study conditions in the hope that a statistical evaluation method used elsewhere can be transferred to the medical evaluation in question. Such manual selection, however has the disadvantage that the search for similar examination methods is very complicated and error-prone. The alternative of consulting a statistics specialist is normally associated with a high cost.

In this context, United States Patent Application Publication No. 2004/0150665 A1 discloses a system and a method for dialog-supported manual selection of a statistical method. The procedure proposed in that document concerns web-based applications and is based on a hierarchically-structured logical process structure that assists the user in steps in making the selection of a statistical tool. The user is successively guided through the selection process and must manually enter data for each of the hierarchical (decision) levels. Dependent on the input data, different masks appear that in turn require further inputs. This step-by-step procedure has the disadvantage of requiring a large time of expenditure. Moreover, the necessity of manually making multiple inputs entails a risk that incorrect inputs cannot be reliably precluded.

SUMMARY OF THE INVENTION

An object of the invention is to provide a method, apparatus, system and computer program product that allow automatic or semi-automatic selection of an evaluation method (in particular a statistical evaluation method) among a number of evaluations methods that are in principle available for a predetermined measurement series of an empirical examination) that is improved (in particular shortened) and can ensue with reduced cost compared to currently used techniques. A further object is to provide such a method, apparatus, system and computer program product that allow the interface with the user to be standardized so that, if inputs are necessary, such inputs can be made via a single user interface.

This object is inventively achieved by a method for selection of an evaluation method (in particular of a statistical evaluation method) from a set of available evaluation methods, which is optimally designed for two or more measurement series to be evaluated, including the following method steps:

recording a number of measurement series-specific determination signals that are available for use for selecting the suitable evaluation method in a first phase, and selecting of the optimally-designed evaluation method from the set of the evaluation methods using an association mechanism that, in a second phase, associates an evaluation method that is optimally designed for the respective measurement series with the determination signals and/or a combination of determination signals.

This object also is achieved by an apparatus, system and computer program product that implement the above-described steps.

The inventive system represents a comprehensive and complex system that implements the selected test in addition to the selection thereof.

The term "phase" as used herein means that actions to be executed within a phase are executed within a hierarchy stage or level of the selection method.

In accordance with the invention, even an inexperienced user can quickly and simply find a correct and optimally-designed test for the empirical measurement series in question. A quick and simple determination as to whether an examination hypothesis can be validated by the implemented empirical examination thus can be made.

Three measurement series-specific determination signals are recorded in a preferred embodiment. These are the number and the type of the measurement series and the type of measurement values of the measurement series. The type of the measurement series indicates the dependency type of the measurement series, for example whether it is a dependent or an independent measurement series. The type of the measurement values specifies whether the values are nominal data, rank data or other measurement values. In the preferred embodiment, these three determination signals are entered through a dialog field of an input device. Alternatively, these determination signals can be wholly or semi-automatically derived from other parameters, or from an acoustic output signal received via a communication connection with the recording apparatus.

A selection of the optimally-designed evaluation method from the set of the evaluation methods that are available for use in principle is inventively implemented only after the recording of the determination signals. If the selection method produces the result that a number of evaluation methods are suitable, a corresponding window appears on a user interface in which the candidate evaluation methods are offered. The user can then select from among these candidate methods. In the event that further information is still required, the user can open a further window (preferably via a further action, for example via a mouse click) in which auxiliary information about the each candidate evaluation method is offered that can then serve as a decision aid. In the event that the user executes no input, an evaluation method from among the candidate methods is automatically determined.

The decision process is characterized by a number of hierarchy stages and can also be represented as a decision tree with a number of levels. A specific path (branch) in the decision tree is selected dependent on each decision. The decision process is structured like a tree in this case.

According to the invention, the user-side procedure is transformed from a tree structure into a two-phase structure. In accordance with the invention it is significant that all determination signals that are relevant for the complete decision process are determined in a (first phase) or in a (first) hierarchy stage.

In a second hierarchy stage, the selection then advantageously ensues wholly automatically and without further inputs on the part of the user. The overall procedure can be substantially accelerated due to the two-stage design of the method. Due to the further degree of automation, a further advantage is a lowering of the error risk due to incorrect inputs.

The inventive method is thus fashioned in two stages: in the first phase or in a first hierarchy stage, all determination signals are recorded that can be used for determination of the suitable evaluation method; in the second phase or in a second hierarchy stage, the recorded determination signals are processed such that one or more evaluation methods are selected from these signals and/or from a combination of the recorded determination signals.

The second phase is thus the selection phase that ensues wholly automatically in the preferred embodiment. In an alternative embodiment of the invention, however, it is possible to execute this second phase semi-automatically, such that the user still has an additional possibility to influence or control the selection process via menu-driven dialog windows.

With the two-stage design of the inventive method it is possible to fashion the recording process and the selection process in a modular manner, to provide suitable interfaces and, for example, to execute these processes in separate components or applications.

A further aspect of the present invention is the design of the interface relative to the user. In accordance with the invention all necessary inputs, namely with regard to the determination signals, can be executed through the same screen mask. In the second phase, no data inputs are necessary (except under the circumstance described above) on the part of the user. The user is therewith confronted with only one screen mask with regard to the data input.

In accordance with the invention the measurement series-specific determination signals are designed such that they enable an optimized determination of the evaluation method with regard to the measurement series to be evaluated. As noted above, three measurement series-specific determination signals are provided in the preferred embodiment. In an alternative embodiment, however, it is possible to record more than three measurement series-specific determination signals, for example through data exchange with other applications, to obtain a broader basis for the subsequent selection. An important advantage in the recording of only three determination signals, however, is that the use of only three determination signals promotes user-friendliness, because only a few inputs must be executed, such that the rest of the selection method can run automatically. Further alternatives of the inventive solution are to record only one or two measurement series-specific determination signals as a basis for the selection process on them.

The basis for the inventive method is an empirical examination with already-detected measurement data or with a measurement series to be evaluated. The study or the examination normally has already concluded and the measurement data are already detected and are present at a recording system. For the further evaluation of the measurement data, it is required to import the measurement data onto the inventive system. In principle there exist two possibilities for this purpose:

1. The measurement data can be transferred from another system (for example a recording system) into the inventive system via an interface in accordance with the invention.
2. The measurement data as manually entered.

In the second case, when the measurement data are manually entered, incorrect inputs often occur. In order to prevent the risk of an incorrect input, preferably the manually input and, thus recorded measurement data of the measurement series to be evaluated are automatically converted into a data format for display on a user interface. The data format is a graphics format that enables the entered data to be represented as a graphic. By means of the graphical visualization of the measurement data, the user can very easily and quickly detect outliers that possibly indicate an incorrect input. The recording of the measurement data typically ensues as the entry of numbers (for example in the form of a table). The number format is then converted into a graphics format, such that a graphical representation of the measurement data on the user interface is possible. This results in a distinctly increased reliability of the system.

The recording of the determination signals and/or the selection of the optimally-designed evaluation method ensues in a menu-driven manner in the preferred embodiment. Input fields, suggestion (prompt) fields and clarification fields that either indicate further information with regard to the current case or request further inputs from the user appear on the user interface as needed. The user-friendliness is thereby increased.

In a preferred embodiment of the invention, the method step of selecting the evaluation method also encompasses the design of the method. This means that, if applicable, further data and/or signals are recorded in the event that further parameters must be determined, so that the respective evaluation method can be optimally tuned to the respective measurement series. In this case, suggestion fields appear on the user interface (if applicable in connection with respective clarification fields) in order to determine these parameters. The inventive method thereby provides not only a selection of the optimally-designed statistical evaluation method, but also the design of the respective method (for example, specification of an error probability, etc.).

In an embodiment of the invention, the recording of the determination signal and/or the selection of the evaluation method ensues automatically. This has the advantage that an untrained user can use the system, that the risk of incorrect inputs is distinctly lowered and that the user-friendliness of the system is increased. In an alternative embodiment, however, the recording and/or the selection are done semi-automatically in a dialog-based manner. The method is thus designed so that the user has the possibility to further influence the selection after each step leading to the selection, for example via the input in dialog windows provided for this purpose. If a specific statistical test method is proposed as a result the inventive method, this proposal can be accepted or declined, such as by a mouse click. Further parameters such as, for example, error probability must now still be set as needed. In this case, a further dialog window with a further proposal for this parameter as a preset value appears. This proposal can be accepted or changed via manual input. Moreover, it is possible to select a different value from the preselected value. In the event that the user requires help for the input of the further parameters, the user can refer back to an additional help module that causes a corresponding dialog window, in which further information is shown to arise on the user interface with regard to the respective parameter.

In the preferred embodiment, the invention is fashioned as an add-on to medical apparatuses. Alternatively, it is possible to fashion the inventive selection module as a separate component with corresponding interfaces. This inventive module is normally hardware-based and/or software-based.

The inventive embodiments of the method that are described above also apply to a computer program product that can be directly loaded into a memory of a programmable computer, with program code or program code segments that cause the computer to execute all steps of the inventive method described above.

Such a computer program product or the program code means can in particular be stored on a computer-readable medium (in particular a storage medium) that is designated for storage and/or execution of the computer-implemented method described above.

DESCRIPTION OF THE DRAWINGS

FIG. 1 is a basic block diagram of a preferred embodiment of the invention.

FIG. 2 illustrates a user interface according to a preferred embodiment of the invention.

DESCRIPTION OF THE PREFERRED EMBODIMENTS

Figure 3:
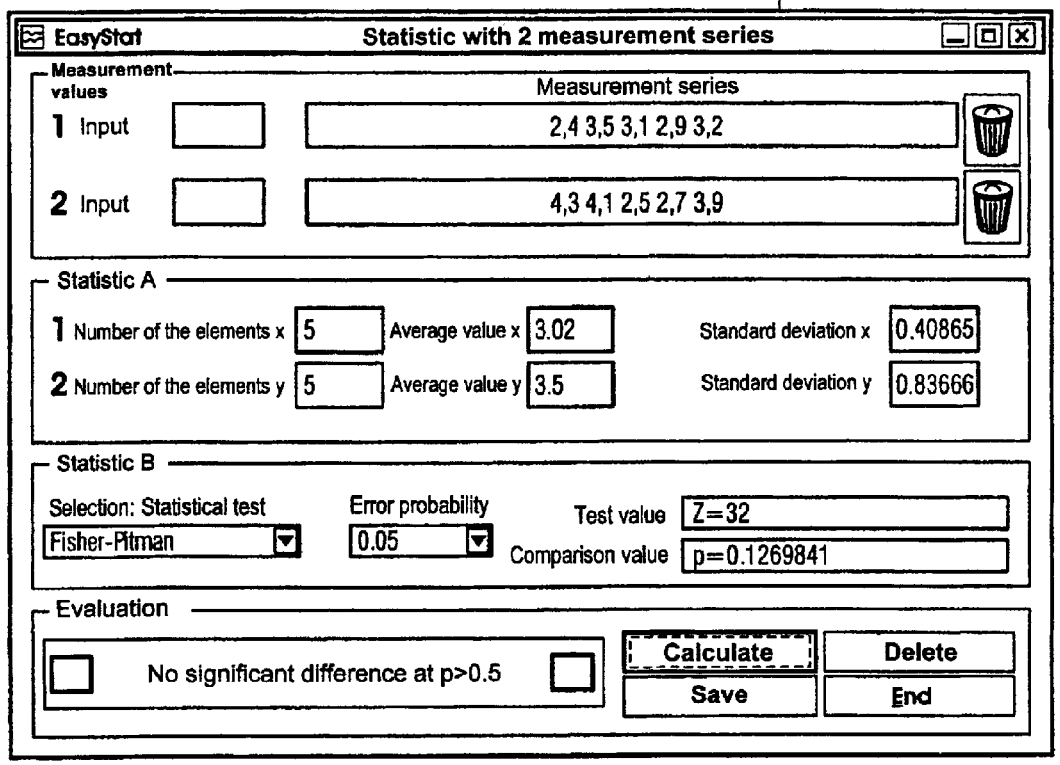
FIG. 3 illustrates a further user interface according to a preferred embodiment of the invention.
Figure 4:
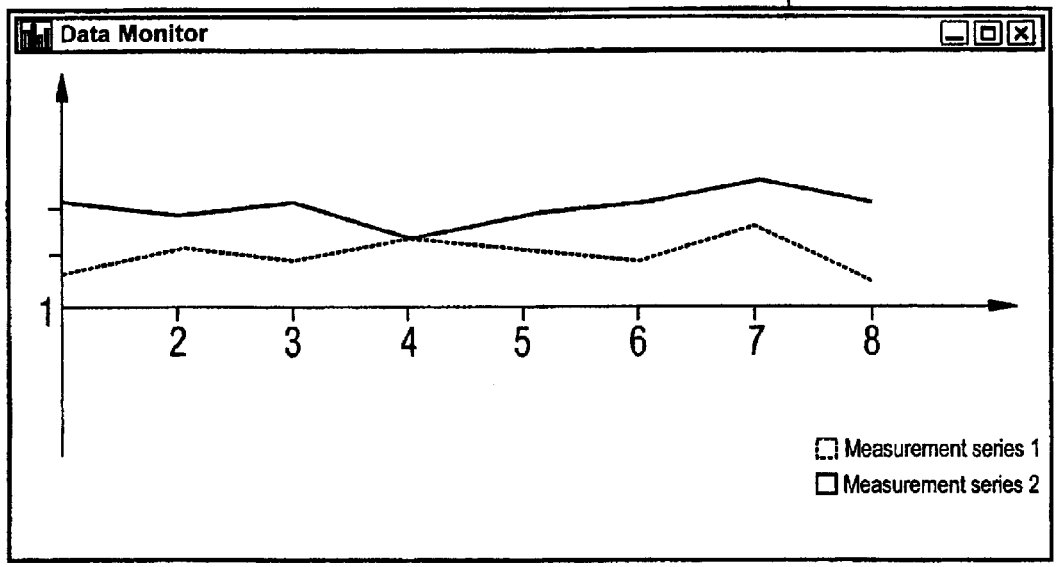
FIG. 4 illustrates a user interface in accordance with the invention with a graphical representation of measurement series.

In connection with FIG. 1, the basic components of an apparatus (generally designated with 1) for selection of a statistical evaluation method are explained.

In the preferred embodiment, the evaluation apparatus 1 has a recording module 2 and a selection module 3. The recording module 2 and the selection module 3 are involved in a data exchange with one another. In an embodiment of the invention it is provided that the recording module 2, the selection module 3 and/or the apparatus 1 are involved in data exchanges with further components. It is therewith possible to automatically import specific data sets and/or to provide the data of the inventive selection process to further modules.

In the preferred embodiment, the inventive apparatus 1 is fashioned as a software-based and/or hardware-based system that has a user interface 4 that serves, among other things, as a communication interface.

The recording module 2 serves to record at least three measurement series-specific determination signals. These determination signals can be characterized by the following three questions:
1. How many measurement series are to be compared?
2. Are they dependent or independent measurement series?
3. Which data type is present? (Nominal data, rank data or other measurement values)

These three determination signals are typically recorded via a corresponding dialog field on the user interface 4, but alternatively the determination signals can be imported from other modules via a provided interface. A first recording phase is concluded after clicking on the corresponding control box on the user interface 4. A second selection phase follows in which, based on the recorded measurement series-specific determination signals, the selection module 3 automatically or semi-automatically selects an optimally-designed and correct evaluation method with regard to the specific measurement series to be evaluated.

It is possible for the selection module 3 select a single evaluation method. This is indicated on the user interface 4. However, multiple evaluation methods typically are suitable for application to the measurement series to be evaluated. In the event that a number of evaluation methods are selected from the set of the evaluation methods that are available in principle, these selected evaluation methods are displayed and suggested in an automatically-superimposed window. The user can then accept a suggestion by activation of an appropriate button.

In the event that the user still requires further information in order to accept or decline a suggestion, the possibility exists to request further information via actuation of a button via a corresponding mouse click, to cause this further information to be displayed on the user interface 4 in a special window provided for this purpose.

In an embodiment of the invention, further determination signals are recorded in order to have a broader basis for the subsequent selection process. In this case, not just the three determination signals cited above, but also additional determination sits are recorded. In another embodiment of the invention only one or two measurement series-specific determination signals are recorded. The "missing" determination signal(s) can automatically be derived, for example, from other data media or systems.

The user interface 4 that displays the result of the selection process is shown in FIG. 2. Here the Fisher-Pitman test was selected. After the display of the result of the selection process it is possible to abort the process, to search for an alternative or to adopt the suggestion. This is enabled via the three buttons, respectively "Abort", "Alternative" and "Accept" in FIG. 2.

If the button "Accept" is actuated, the user interface 4 can display the window shown in FIG. 3. Here further data can be selected, in particular the error probability. Here suggestions with regard to the further data are also offered to the user, which suggestions can be declined or accepted. Here, for example, the error probability is preset with 0.05.

In an embodiment of the invention, the apparatus 1 additionally has a measurement data recording module that is designed to record later measurement data of the measurement series to be evaluated. The measurement data typically are entered into the system manually in tables or in the form of number inputs. This hereby leads to incorrect inputs. If these number specifications are merely shown on the user interface 4, incorrect inputs and what are known as "outliers" can be detected only with great difficulty. It is therefore inventively provided to convert the measurement data into another data format. The measurement data recorded as number specifications are typically converted into a graphics format that enables a graphical representation and visualization of the input measurement data as shown in FIG. 5. Given the representation of the measurement series in the form of a graph, the outliers are immediately and directly recognized and can be corrected immediately.

It is typically provided to incorporate the inventive method into existing systems such that a program start of the inventive method automatically ensues given processing of a measurement series. A window in which the inventive selection method can be indicated then appears on the user interface 4. It can be activated via actuation of a key, a key combination or the mouse.

The preferred embodiment of the invention described above refers to a semi-automatic design of the method. In particular the determination signals are thereby generated via user inputs via the user interface 4. In an embodiment of the invention, the recording phase and/or the selection phase proceed in a wholly automatic manner. The determination signals are then recorded via importation of specific data sets. The selection process then ensues as in the first case (wholly automatically), with access to an association mechanism based on the recorded determination signals taking place. In the association mechanism an evaluation method or a selection of evaluation methods is associated with each determination signal and/or with a combination of determination signals. This one evaluation method or the selection of evaluation methods is then the result of the selection process and is shown on the user interface 4 as a suggestion in the generated window. The association mechanism can be fashioned, for example, as a look-up table that contains all possible combinations of determination signals.

In this embodiment, the set of the statistical tests for the comparison of two measurement series comprises the following tests: the chi-square four field test, the McNemar test, the median test, the U-test by Mann-Whitney, the Wilcoxon test, the Fisher-Pitman test, the Fisher randomization, the students t-test and the differences t-test. The set of the statistical tests for the comparison of three or more measurement series comprises the following tests: the chi-square multiple field test, the Cochran test, the k-sample median test, the Friedman test, the variance analysis for independent samples and the variance analysis for dependent samples. Moreover, the chi-square adaptation test is considered that is designed for the comparison of a theoretical distribution with an empirical distribution, as is the correlation analysis.

The method described in detail in the preceding as well as the shown apparatus are only exemplary embodiments that can be modified in various manners by those skilled in the art without departing from the scope of the invention. The primary application field of the inventive solution is in the field of medically-related measurement series, but the procedure described herein can be transferred to other technical fields that require a further analysis and/or evaluation of measurement data such as, for example, quality assurance in the framework of technical production.

I claim as my invention:

1. A computerized method for selecting an evaluation method for evaluating at least two measurement data series, comprising the steps of:
    in a first phase in a computer, generating a plurality of measurement data series-specific determination signals representing information applicable for selection of an existing statistical evaluation method for evaluating at least two measurement data series;
    in a second phase in said computer following said first phase, automatically selecting, without manual intervention, a statistical evaluation method from a set of existing statistical evaluation methods that are available for evaluating a statistical relationship of said at least two measurement data series, by automatically associating an evaluation method in said set with said determination signals and/or a combination of said determination signals to obtain, as a selected evaluation method, at least one evaluation method that is optimally designed to evaluate said statistical relationship of said at least two measurement data series; and
    visually displaying an identification of the automatically selected evaluation method.

2. A method as claimed in claim 1 comprising selecting a plurality of evaluation methods from among said set of evaluation methods, which are each suitable for use as said optimally-designed evaluation method, and visually displaying at least one of the selected plurality of evaluation methods.

3. A method as claimed in claim 1 comprising generating at least three measurement series-specific determination signals, respectively designating a number of said measurement data series, a type of said measurement data series and a type of measurement data values of said measurement data series.

4. A method as claimed in claim 1 comprising the additional steps of:
    recording measurement data for said measurement data series to be evaluated; and
    automatically electronically converting the recorded measurement data into a data format for visual display of the converted measurement data at a user interface.

5. A method as claimed in claim 1 comprising allowing user interaction via an interface to generate said measurement data series-specific determination signals.

6. A method as claimed in claim 1 comprising automatically electronically automatically electronically reading said at least two measurement data series and generating said plurality of measurement series-specific determination signals without manual intervention.

7. An apparatus for selecting an evaluation method for evaluating at least two measurement data series, comprising:
   a recording unit supplied with at least two measurement data series that, in a first phase, generates an output representing a plurality of measurement series-specific determination signals representing information applicable for selection of a statistical evaluation method for statistically evaluating said at least two measurement series;
   a selection unit that, in a second phase following said first phase, automatically, without manual intervention, selects a statistical evaluation method from a set of existing statistical evaluation methods that are available for evaluating a statistical relationship of said at least two measurement series, by automatically associating an evaluation method in said set with said determination signals and/or a combination of said determination signals to obtain, as a selected evaluation method, at least one evaluation method that is optimally designed to evaluate said statistical relationship of said at least two measurement series; and
   a display connected to said selection unit at which said selection unit causes an identification of the automatically selected evaluation method to be visually displayed.

8. An apparatus as claimed in claim 7 wherein said selection unit selects a plurality of evaluation methods from among said set of evaluation methods, which are each suitable for use as said optimally-designed evaluation method, and visually displays at least one of the selected plurality of evaluation methods.

9. An apparatus as claimed in claim 7 wherein said recording unit generates at least three measurement series-specific determination signals, respectively designating a number of said measurement series, a type of said measurement series and a type of measurement values of said measurement series.

10. An apparatus as claimed in claim 7 comprising a user interface, and wherein said recording unit records measurement data for said measurement series to be evaluated, and automatically electronically converts the recorded measurement data into a data format for visual display of the converted measurement data at said user interface.

11. An apparatus as claimed in claim 7 comprising a user interface allowing user interaction to generate said measurement data series-specific determination signals.

12. An apparatus as claimed in claim 7 wherein said recording unit automatically electronically automatically electronically reading said at least two measurement data series and generating said plurality of measurement series-specific determination signals without manual intervention.

13. A system for selecting an evaluation method for evaluating at least two measurement data series, comprising:
   a recording unit supplied with at least two measurement data series that, in a first phase, automatically generates a plurality of measurement series-specific determination signals representing information applicable for selection of a statistical evaluation method for statistically evaluating said at least two measurement data series;
   a selection unit that, in a second phase following said first phase, automatically selects, without manual intervention, a statistical evaluation method from a set of existing statistical evaluation methods that are available for evaluating a statistical relationship of said at least two measurement series, by automatically associating an evaluation method in said set with said determination signals and/or a combination of said determination signals to obtain, as a selected evaluation method, at least one evaluation method that is optimally designed to statistically evaluate said statistical relationship of said at least two measurement data series; and
   an evaluation module that automatically evaluates said statistical relationship of said at least two measurement data series, without manual intervention, using said selected evaluation method to produce an evaluation result as a humanly perceptible output.

14. A system as claimed in claim 13 comprising a user interface allowing user interaction to generate said measurement data series-specific determination signals.

15. A system as claimed in claim 13 wherein said recording unit automatically electronically automatically electronically reading said at least two measurement data series and generating said plurality of measurement series-specific determination signals without manual intervention.

16. A computer-readable medium encoded with a data structure that, when loaded into a computer to which at least two measurement data series are supplied, causes said computer to:
   in a first phase, generate a plurality of measurement data series- specific determination signals representing information applicable for selection of a statistical evaluation method for statistically evaluating said at least two measurement data series;
   in a second phase following said first phase, select a statistical evaluation method, without manual intervention, from a set of existing statistical evaluation methods that are available for evaluating a statistical relationship of said at least two measurement data series, by automatically associating an evaluation method in said set with said determination signals and/or a combination of said determination signals to obtain, as a selected evaluation method, at least one evaluation method that is optimally designed to evaluate said statistical relationship of said at least two measurement data series; and
   cause an identification of the automatically selected evaluation method to be visually displayed.

17. A computer-readable medium as claimed in claim 16 wherein said data structure allows said computer to accept entries made by user interaction with said computer to generate said plurality of measurement data series-specific determination signals.

18. A computer-readable medium as claimed in claim 16 wherein said data structure causes said computer to automatically generate, without manual intervention, said plurality of measurement data series-specific determination signals.

* * * * *